United States Patent
Ahoor et al.

(10) Patent No.: US 6,678,729 B1
(45) Date of Patent: Jan. 13, 2004

(54) METHOD OF MONITORING THE AVAILABILITY OF A MESSAGING AND VOIP NETWORKING

(75) Inventors: Roy Ahoor, Colorado Springs, CO (US); Kenneth M. Webb, Colorado Springs, CO (US); Stephen J. Berscheid, Englewood, CO (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/515,153

(22) Filed: Feb. 29, 2000

(51) Int. Cl.[7] .............................................. G06F 15/173
(52) U.S. Cl. ........................ 709/224; 709/227; 714/712; 714/31; 707/10
(58) Field of Search ................................ 709/224, 204, 709/206, 233, 227; 707/102, 104; 379/9, 10.03, 9.01, 9.02, 9.04; 714/38, 46, 712, 31; 710/105

(56) References Cited

U.S. PATENT DOCUMENTS

| | | | | |
|---|---|---|---|---|
| 5,671,351 A | * | 9/1997 | Wild et al. ..................... | 714/38 |
| 5,838,766 A | * | 11/1998 | Rand ............................. | 379/9 |
| 5,854,823 A | * | 12/1998 | Badger et al. ............ | 379/15.01 |
| 5,854,889 A |   | 12/1998 | Liese et al. | |
| 5,978,940 A | * | 11/1999 | Newman et al. ............. | 714/712 |
| 6,029,198 A | * | 2/2000 | Iizuka ......................... | 709/224 |
| 6,038,598 A |   | 3/2000 | Danneels ..................... | 709/219 |
| 6,092,078 A | * | 7/2000 | Adolfsson ................... | 707/102 |
| 6,108,704 A |   | 8/2000 | Hutton et al. ............... | 709/227 |
| 6,148,335 A | * | 11/2000 | Haggard et al. ............ | 709/224 |
| 6,192,108 B1 | * | 2/2001 | Mumford et al. .............. | 379/9 |
| 6,282,678 B1 | * | 8/2001 | Snay et al. ................. | 714/712 |
| 6,397,359 B1 | * | 5/2002 | Chandra et al. ............ | 714/712 |
| 6,539,384 B1 | * | 3/2003 | Zellner et al. ................ | 707/10 |

* cited by examiner

Primary Examiner—Wellington Chin
Assistant Examiner—Chuong Ho (57) ABSTRACT

A method of monitoring the availability of a network on a monitor web page, includes the steps of: reading query information and depositing query requests into a corresponding one of a plurality of request queues; reading the query requests from the corresponding request queue and sending the query requests to at least one remote network device by sending calls over the IP or SNA network; receiving a reply to the calls from the at least one remote network device indicating an availability status of the at least one remote network device and processing the availability status; depositing the processed availability status in a Web Site Queue; and retrieving the processed availability status from the Web Site Queue and displaying status information for the at least one network device on the monitor web page, the status information being derived from the processed availability status.

17 Claims, 6 Drawing Sheets

METHOD OF MONITORING THE AVAILABILITY OF A MESSAGING AND VOIP NETWORKING

BACKGROUND OF THE INVENTION

1. Field of the Invention

The present application relates generally to the monitoring of network environments, and more specifically to a method of viewing the availability of a messaging and voice over IP network on a web-site.

2. Description of the Related Art

A messaging network is comprised of multiple messaging hosts interconnected via network paths. The resulting connectivity enables several features, such as sharing of data and other resources on the network. For example, networks enable applications such as electronic mail, network file systems, distributed processing and voice over IP (VOIP). These applications involve the operation of several network elements and provide enhanced communication capabilities. Network elements include hardware devices and software entities which operate according to interface specifications to provide the network communication capabilities. The interfaces are typically based on open standards such as transmission control protocol/Internet protocol (TCP/IP) or SNA.

Proper monitoring of such networks is critical in maintaining the network communication capabilities. The proper operation of each network element is often critical in a networking environment, since the malfunctioning of any network element in the path between two computer systems, or two network resources, may adversely impact the applications and services between the two computer systems. Additionally, where the network elements are typically shared by several computer systems, many of them located in remote networks, performance bottlenecks are often of great concern.

A network manager or operator may wish to monitor the status of a remote network. However, it is often impractical to install or provide software for managing each network element on all remote sites. In addition, a manager or operator may wish to monitor the status of the remote network from any of several work stations. More importantly, a manager or operator may wish to view the availability of the entire messaging and VOIP network on a single web site. In this way, network messaging outages and delays can be minimized, thereby reducing the delays in business operations which cause lost time and decreased customer satisfaction, resulting in lost revenue.

Therefore, a need exists for remotely monitoring the availability of an entire messaging and VOIP network on a single web site.

SUMMARY

It is therefore an object of the present application to provide a method of viewing and monitoring the availability of an entire messaging and VOIP network from a single web site.

It is another object of the present application to provide a method for viewing and monitoring the availability of an entire messaging and VOIP network by periodically traversing all possible nodes using all existing network routes to ascertain the availability of the entire system.

To achieve the above objects, a method of monitoring the availability of an Internet Protocol (IP) network on a monitor web page in accordance with the present invention is provided, which includes the steps of: reading query information and depositing query requests into a corresponding one of a plurality of request queues; reading the query requests from the corresponding request queue and sending the query requests to at least one remote network device by sending calls over the IP network; receiving a reply to the calls from the at least one remote network device indicating an availability status of the at least one remote network device and processing the availability status; depositing the processed availability status in a Web Site Queue; and retrieving the processed availability status from the Web Site Queue and displaying status information for the at least one remote network device on the monitor web page, the status information being derived from the processed availability status.

BRIEF DESCRIPTION OF THE DRAWINGS

The above and other objects, features, and advantages of the present invention will become more apparent in light of the following detailed description of an exemplary embodiment thereof taken in conjunction with the attached drawings in which.

DETAILED DESCRIPTION OF THE PREFFERED EMBODIMENT

In the detailed description which follows, commonly known functions or construction are not described in detail to avoid obscuring the invention in unnecessary detail. The term Registry, as used hereinafter, refers to an application program interface that allows inter-device message queuing and network connectivity. Any other messaging and query interface such as IBM M2 Series may also be added.

Figure 1:
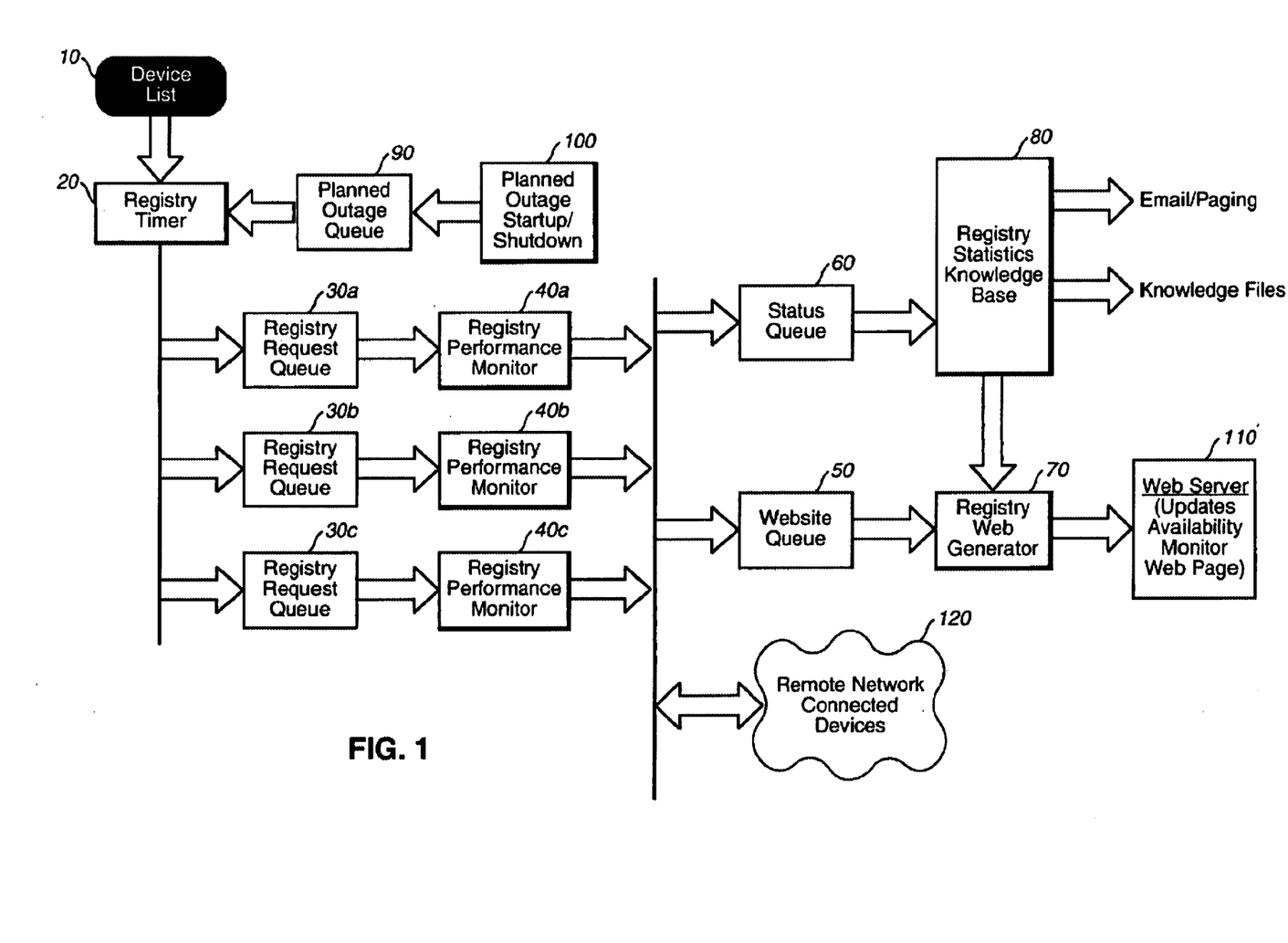
FIG. 1 is a block diagram illustrating the inter-relation of several network elements used in accordance with an embodiment of the present method.

Turning now to the drawings, in which like reference numerals identify similar or identical elements throughout the several views, FIG. 1 is a block diagram illustrating the network elements used in a preferred embodiment of the present invention.

Referring to FIG. 1, a file called Device List 10 contains a list of remote network connected devices 120 to be queried. More particularly, Device List 10 contains a list of remote network connected devices 120 along with their associated DNS (Domain Name Server) names and all possible network routes used to access the remote network connected devices 120. Device List 10 is created using a text editor and allows the categorizing of the remote network devices for analysis. Registry Timer 20, a software program, reads the file Device List 10 to obtain the names and type of tests to be performed on the network connected devices 120 and sequentially deposits the query information in the appropriate Registry Request Queue 30a, 30b, 30c, etc. for processing. The query information deposited in the Registry Request Queues 30*a*, 30*b*, 30*c* are then read by a corresponding software program Registry Monitor 40*a*, 40*b*, 40*c*, etc. Registry Monitor 40*a*, 40*b*, 40*c* sends the read query information to the appropriate destination, namely, the network connected device 120, and requests a reply from the network connected device 120.

Here, Registry Monitor 40*a*, 40*b*, 40*c* traverses the same network path using the same network layers as does messaging applications using the network connected device. Therefore, the availability of the network connected device 120 is verified in accordance with the reply, or lack thereof. Also, each Registry Monitor 40*a*, 40*b*, 40*c*, along with its respective Registry Request Queue 30*a*, 30*b*, 30*c*, may be conveniently assigned to respective network connected devices 120. For instance, Registry Monitor 40*a* and Registry Request Queue 30*a* can be assigned to all nodes belonging to a second layer of categorized nodes according to Device List 10, and thereby handle all requested calls in a timely manner. Therefore, any number of queues, including a single queue, can contain all requests, and Registry Monitor 40*a*, 40*b*, 40*c* can call any network device specified because Registry Monitor 40*a*, 40*b*, 40*c* determines the name of the device to be called by reading the request and does not need to constrain the intended destination based on the queue it read the request from.

Registry Monitor 40*a*, 40*b*, 40*c*, upon receiving corresponding replies from the network connected devices 120, forwards the status of the network connected devices 120 to a Status Queue 60 and a Web Site Queue 50. The Web Site Queue 50 is read by software program Registry Web Generator 70, which retrieves the availability status message and updates the availability monitor web pages with the latest status of the remote network connected devices 120 via the Web Server 110.

The Status Queue 60 provides availability status messages to software program Registry Knowledge Base 80. Registry Knowledge Base 80 analyzes the network information and provides statistical and historical information about the network connected devices 120 to client processors requesting information about a particular node via the Registry Web Generator 70 and Web Server 110. Registry Knowledge Base 80 also provides email and paging capabilities for additional notification of personnel and stores current knowledge files containing current network device information. The knowledge files are available for retrieval upon system shutdown.

Registry Knowledge Base 80 also writes data to its own internal record-keeping files. The statistical and historical data and analysis regarding the network devices is also provided to Registry Web Generator 70 by Registry Knowledge Base 80. Registry Knowledge Base 80 contains data about the network connected devices and provides information about all known network nodes to clients. For example, a client, in this case Registry Web Generator 70, sends a "?" command to obtain the overall status of all network connected devices or may specify an object name, such as "IP.PROD.NODEL?", or specifies the ID for the device, such as "123?". By asking for a specific network node by name or by ID, the client receives statistical data and actual observations and the time of each observation for the network device. When asking for the status of all network devices using a "?", the client gets the statistical data for all network devices containing data.

A Planned Outage 100 software program deposits information regarding planned network connected device outages into the Planned Outage Queue 90. The outage information is obtained from the network device orchestrating the planned outages. This information is read by Registry Timer 20 and provided to the availability monitor web page via downstream processes to inform an operator when a network connected device is not available due to a pre-planned event.

Figure 2:
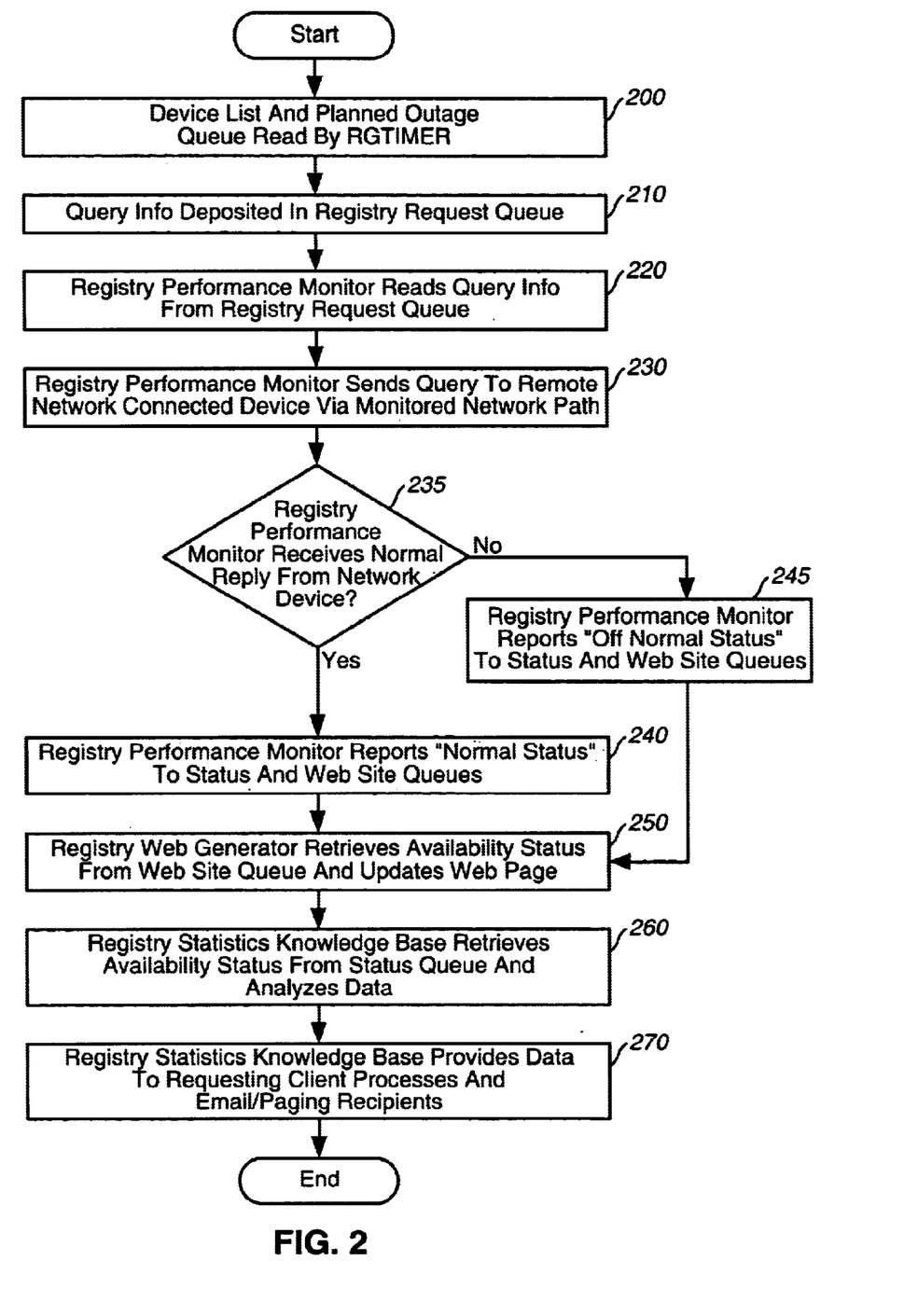
FIG. 2 is a flowchart illustrating the procedure used for gathering monitoring status information, with reference to the diagram of FIG. 1, in accordance with the preferred method.

FIG. 2 is a flowchart illustrating the procedure in which monitoring data is processed using the network elements of FIG. 1. Referring to FIG. 2, Registry Timer 20 reads the file Device List 10 and the planned outage queue 90 in step 200. Registry Timer 20 deposits the query information in the appropriate Registry Request Queue 30*a*, 30*b*, 30*c* for processing in step 210. Thereafter, Registry Monitor 40*a*, 40*b*, 40*c* reads the query information from the corresponding Registry Request Queue 30*a*, 30*b*, 30*c* in step 220. Registry Monitor 40*a*, 40*b*, 40*c* then sends the requested query to the requested destination, i.e. the network connected device 120, using a Registry call in step 230. A reply from the remote network connected device is requested in the Registry call. If Registry Monitor 40*a*, 40*b*, 40*c* receives an expected reply (normal reply) from the network connected device in step 235, Registry Monitor 40*a*, 40*b*, 40*c* reports a corresponding "available status" to the Status Queue 60 and Web Site Queue 50 in step 240. Alternatively, if Registry Monitor 40*a*, 40*b*, 40*c* does not receive a normal reply from the network connected device 120 in step 235, Registry Monitor 40*a*, 40*b*, 40*c* reports an "unavailable status" to the Status Queue 60 and Web Site Queue 50 in step 245. A third state, termed "abnormal status" is determined by comparing the most recent observation of the network device with the standard deviation of the data population. For instance, if a observation is outside of the control band of NORMAL DATA RANGE=DATA POPULATION AVERAGE+/−3 X (DATA POPULATION STANDARD DEVIATION) then that observation is flagged as an abnormal observation, providing an "abnormal status". An "abnormal status" is generally a sign that something unusual is going on with the network device which should be investigated to improve availability of the device. Here it is important to note that Registry Monitor 40*a*, 40*b*, 40*c* traverses the same network path utilizing the same network layers as the messaging applications that make use of the network connected device. In this way, the availability of the network connected devices is verified.

Registry Web Generator 70 then retrieves the availability status from the Web Site Queue 50 by making a Registry call and continuously updates the availability monitor web page via the Web Server 110 in step 250. Here, monitoring tests are run periodically, with the results being used to update the web site with the availability status of monitored network connected devices 120.

Registry Knowledge Base 80 retrieves availability status from Status Queue 60 by making a Registry call in step 260. Registry Knowledge Base 80 then analyzes the historical information for each and every network connected device, detecting hard failures and flagging the network connected device when unavailable. Registry Knowledge Base 80 also calculates the average, minimum, maximum, and standard deviation of data received, performs a multivariate regression analysis to ascertain cause and effect relationships between data, and reports the results if the regression correlation factor R is greater than a predetermined value, preferably 0.8. Regression analysis provides a means to isolate the effects of one independent variable, for instance a network device from the effects of the other and to determine the contribution of each network device to the total effect. Registry Knowledge Base 80 then provides this and other data including the status of the network connected device 120, the data points and times they occurred, and statistical data to client processors requesting information about a particular node in step 270. Registry Knowledge Base 80 also provides this information to email and paging recipients via conventional email and paging applications.

Figure 3:
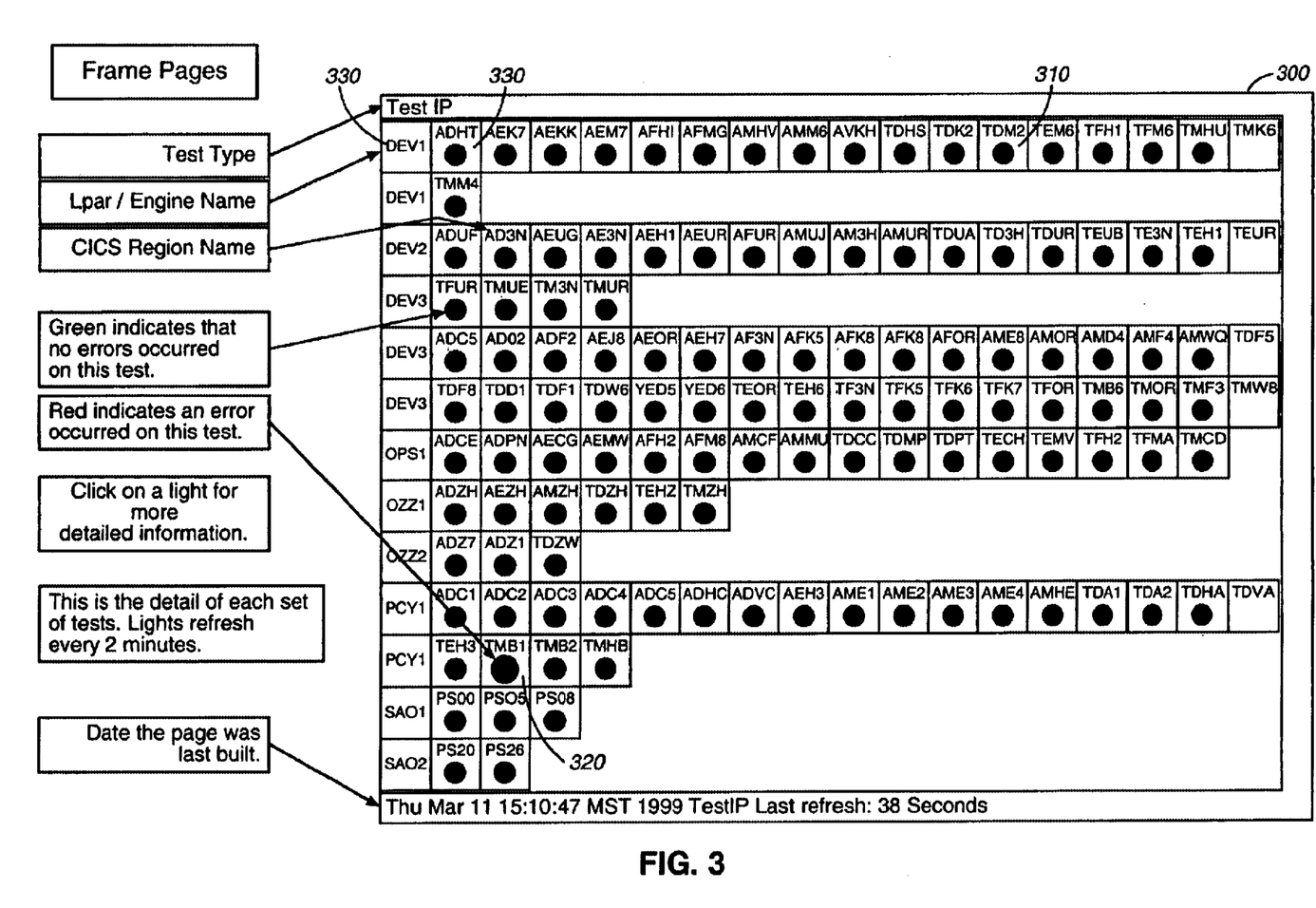
FIG. 3 illustrates a frame page displayed on the monitor web page in accordance with the preferred method.

Referring to FIG. 3 a typical frame page 300 on the availability monitor web page is shown. Included in the frame page 300 is a plurality of status LEDs 310 arranged in a tabular format according to network connected device identifiers 330. A green status LED indicates that no errors have occurred during the testing of the respective device as indicated by LED 310. A red status LED 320 indicates that an error has occurred communicating with the respective device, indicating the device is unavailable. A yellow status LED (not illustrated) indicates "abnormal status" when there has been an abnormal observation during communication with the respective device as described above. Here, the status of multiple network connected devices is represented on a single frame page, thus enabling an operator to view the status of an entire network conveniently from one location and virtually simultaneously. The frame page 300 is refreshed periodically, for example every two minutes. An operator can obtain more detailed information about a respective device by clicking on the devices status LED 310 on the frame page 300, thereby viewing a detailed page about the respective device as represented in FIG. 4A.

Figure 4A:
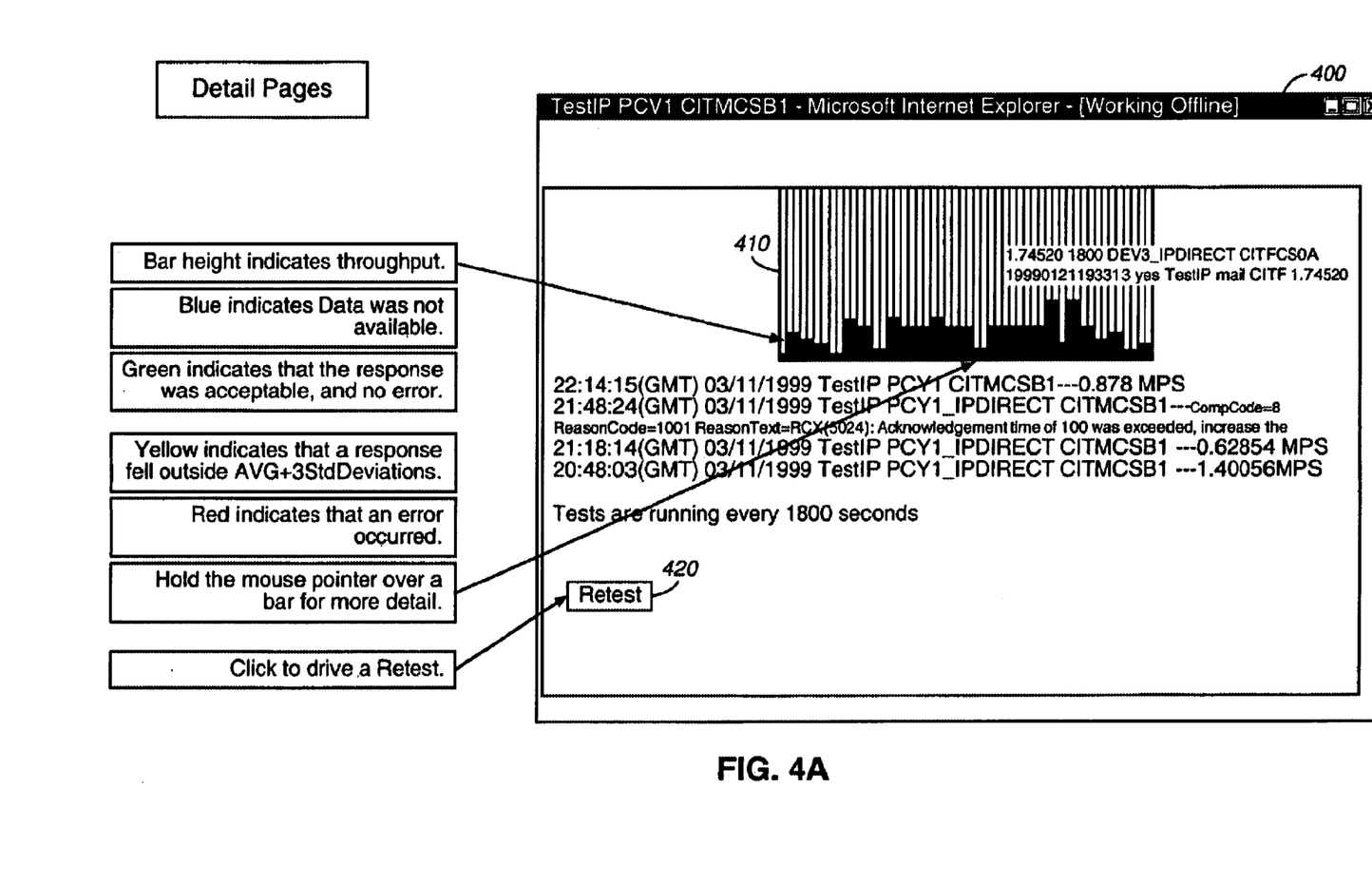
FIGS. 4A and 4B illustrate detail pages displayed on the monitor web page of FIG. 3.
Figure 4B:
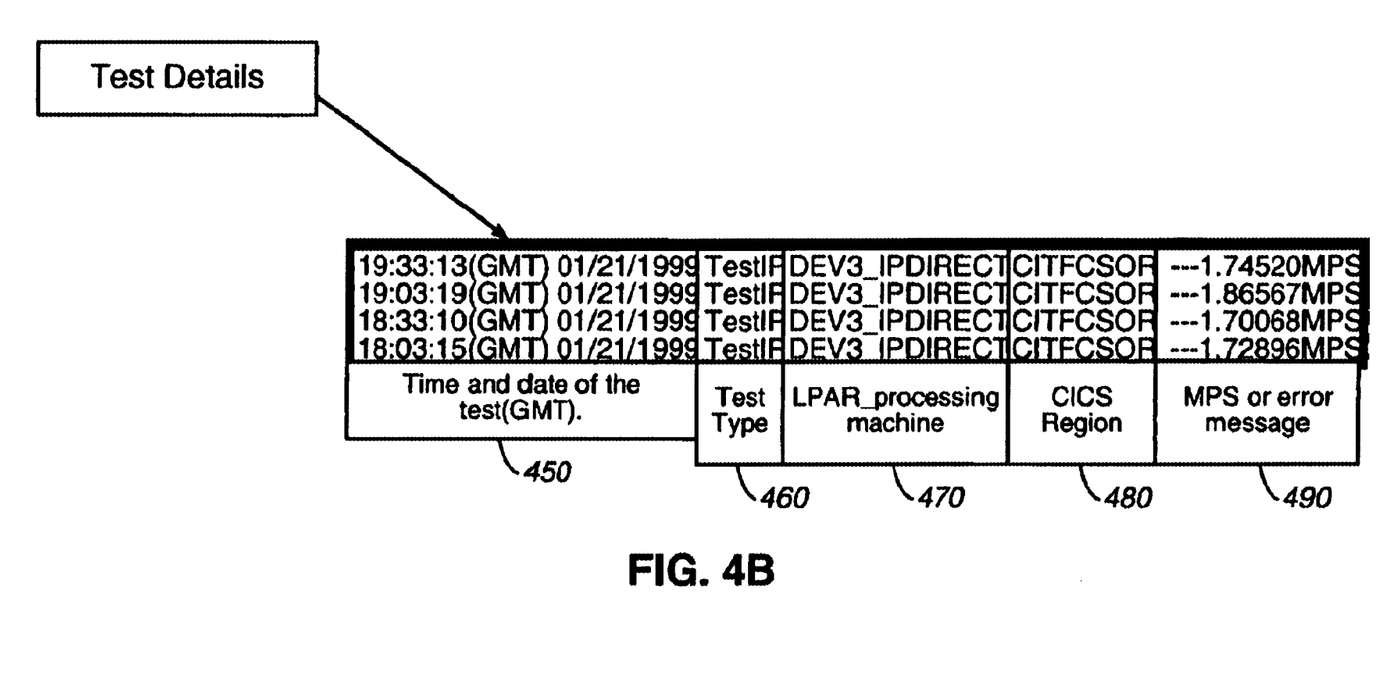

Referring to FIG. 4A, a detail page 400 is shown. The detail page 400 preferably provides a bar graph 410 illustrating the throughput values of the selected device over time. A test button 420 is provided to allow an operator to manually initiate a test. Additionally, details of the test performed on the device are shown below the bar graph 410, as identified in FIG. 4B. The testing details provided include the time and date of the test 450, the type of test 460, network device identifiers 470, 480, and the MPS speed of the device or associated error message 490, as appropriate.

Figure 5:
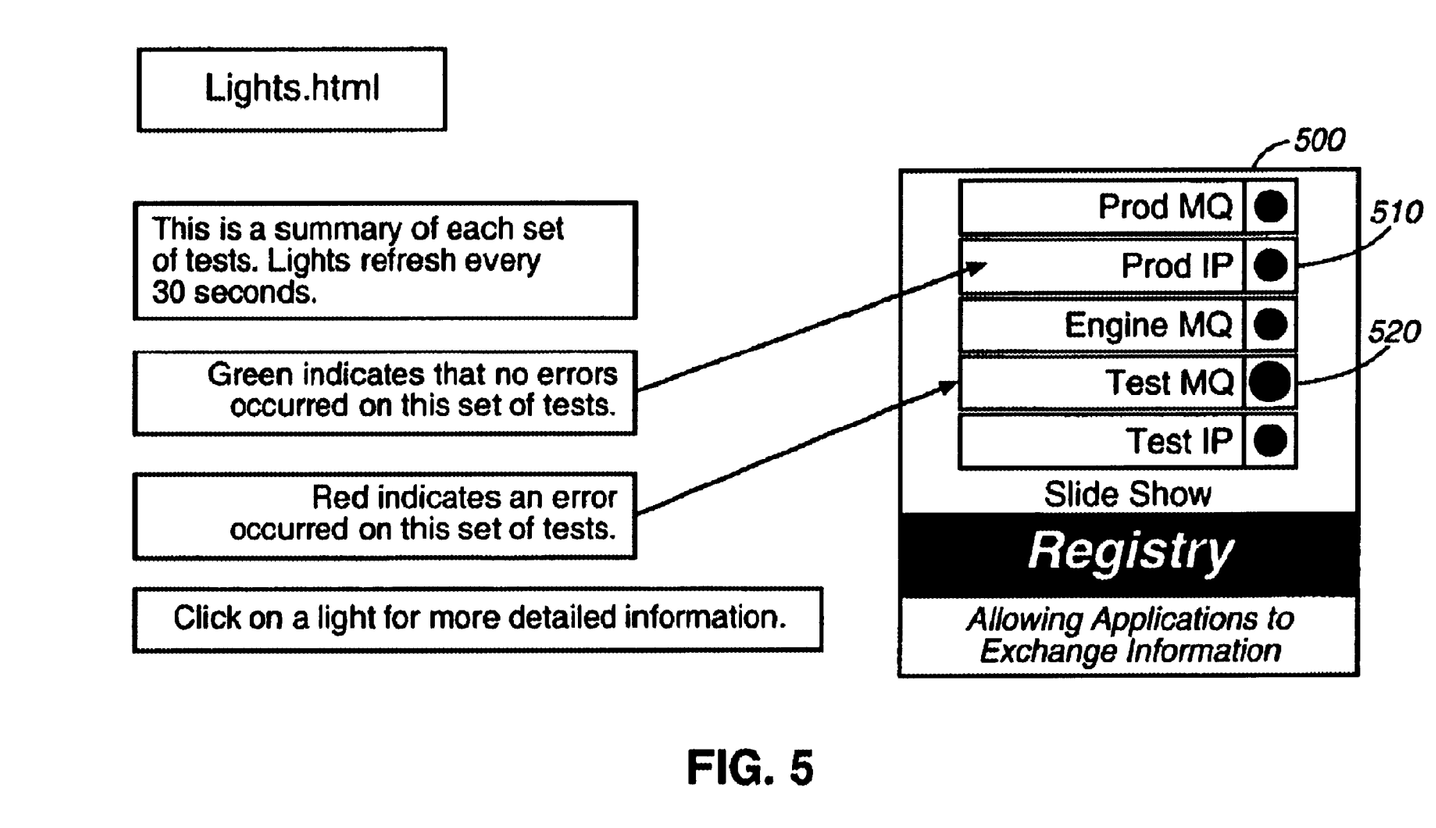
FIG. 5 illustrates status summaries displayed on the monitor web page of FIG. 3.

Also shown on the monitoring availability web page are a set of summary LEDs 500, as illustrated in FIG. 5. These LEDs summarize the overall status for each set of tests performed. A green summary status LED 510 indicates that no errors occurred during the respective set of tests. A red summary status LED 520 indicates that an error occurred during the respective set of tests.

In summary, the present invention provides a convenient method of monitoring on a single web page the overall availability of an entire messaging and VOIP network by traversing all possible nodes via all existing network routes periodically to ascertain the availability of the entire system. Statistical and historical data is also collected for additional analysis and monitoring. The availability of messaging, VOIP and the network layer below the messaging layer is verified, since the messaging layer depends on the sublayers to function.

While the present invention has been described in detail with reference to a preferred embodiment, it represents a mere exemplary application. Thus, it is to be clearly understood that many variations can be made by anyone of ordinary skill in the art while staying within the scope and spirit of the present invention as defined by the appended claims.

What is claimed is:

1. A method of monitoring availability status of at least one network device in an Internet Protocol (IP) network on a monitor web page, the method comprising the steps of:

(a) reading a query file and depositing query requests into a corresponding one of a plurality of request queues;

(b) reading the query requests from the corresponding request queue and sending the query requests to the at least one network device by sending calls over the IP network;

(c) receiving a reply to the calls from the at least one network device indicating an availability status of the at least one network device and processing the availability status;

(d) depositing the processed availability status in a Web Site Queue; and (e) retrieving the processed availability status from the Web Site Queue and displaying status information from the at least one network device on the monitor web page, said status information derived from the processed availability status.

2. The method recited in claim 1, wherein steps (a)–(d) are repeated periodically for each at least one network device.

3. The method recited in claim 1, wherein step (e) is repeated periodically, thereby updating the status information on the monitor web page at regular intervals.

4. The method recited in claim 1, wherein steps(a)–(e) are performed upon operator command for an operator specified at least one network device.

5. The method recited in claim 1, wherein the query information includes the names, locations, and types of tests required for the at least one network device.

6. The method recited in claim 1, wherein the call to the at least one network device includes a request for a reply and traverses a network path using the same network layers as messaging applications which communicate with the at least one network device for purposes other than monitoring, thereby verifying the availability of the at least one network device.

7. The method recited in claim 1, wherein step (d) includes the further step of depositing the processed availability status in a Status Queue.

8. The method recited in claim 7, wherein the processed availability status is retrieved from the Status Queue periodically and stored chronologically, thereby providing historical data for the at least one network device.

9. The method recited in claim 8, wherein the historical data is analyzed for the at least one network device, thereby calculating and reporting the average, minimum, maximum, and standard deviation of the historical data, for viewing on the monitor web page.

10. The method recited in claim 9, wherein a multivariate regression analysis is also performed on related historical data to ascertain a cause and effect relationship and to obtain a correlation factor, a result of the multivariate regression analysis being reported for viewing on the monitor web page when the correlation factor is greater than a predetermined value.

11. The method recited in claim 1, wherein the monitor web page receives information regarding planned shutdowns of the at least one network device and displays the planned shutdown information accordingly.

12. The method recited in claim 1, wherein the monitor web page displays a plurality of status LEDs, each status LED corresponding to and providing an availability status indication for a respective one of the at least one network devices.

13. The method recited in claim 12, wherein the each status LED displays green, yellow, and red when the respective network device state is available, abnormal, and unavailable, respectively.

14. The method recited in claim 12, wherein additional detail information is viewable for the respective network device, the detail information including throughput amount, a time and date of each test, a test type, a data rate, and a network device identifier.

15. The method recited in claim 12, wherein the monitor web page displays a plurality of summary LEDs, each summary LED indicating whether at least one error occurred during a respective set of tests of the at least one network device.

16. The method recited in claim 13, wherein the respective network device's state is abnormal when a data range of the respective network device is outside a control band of DATA POPULATION AVERAGE +/−3 X (DATA POPULATION STANDARD) DEVIATION).

17. A method of monitoring availability status of a plurality of network devices in an Internet Protocol (IP) network on a monitor web page, the method comprising the steps of:

(a) reading a query file and depositing query requests into a corresponding one of a plurality of request queues;

(b) reading the query requests from the corresponding request queue and sending the query requests the plurality of network devices by sending calls over the IP network;

(c) receiving a reply to the calls from the plurality of network device s indicating an availability status of the plurality of network devices and processing the availability status;

(d) depositing the processed availability status in a Web Site Queue; and (e) retrieving the processed availability status from the Web Site Queue and displaying status information from the plurality of network devices on the monitor web page, said status information derived from the processed availability status.

* * * * *